United States Patent Office 3,509,138
Patented Apr. 28, 1970

3,509,138
REACTIVE PHTHALOCYANINE DYESTUFFS
Harlan B. Freyermuth and David I. Randall, Easton, Pa., assignors to GAF Corporation, a corporation of Delaware
No Drawing. Continuation-in-part of application Ser. No. 517,129, Dec. 28, 1965. This application Apr. 13, 1966, Ser. No. 542,230
Int. Cl. C07f 1/08
U.S. Cl. 260—242    5 Claims

ABSTRACT OF THE DISCLOSURE

A dyestuff of the formula:

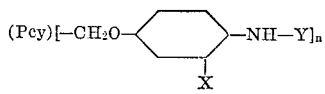

wherein Pcy represents a dyestuff moiety of the phthalocyanine series, X represents —H, —SO$_3$H or —SO$_2$NR$^1$R$^2$, R$^1$ and R$^2$ represent H, aryl or lower lalkyl or, together with the N atom, the atoms necessary to complete a 5 or 6 membered heterocycle, Y represents a 2-chloro-s-triazinyl-(6) radical, and $n$ has an average value of about 1 to 4, which dyestuff is useful for coloring fibrous materials by a reactive dyeing process under alkaline conditions.

---

This application is a continuation in part of our application Ser. No. 517,129 filed Dec. 28, 1965, now U.S. Patent No. 3,384,644.

The present invention relates to new phthalocyanine dyestuffs and more particularly to a novel group of fiber-reactive halo-triazinyl containing phthalocyanine dyestuffs, methods for producing same, methods for coloring fibrous material therewith, and the resulting colored fibers.

A few fiber-reactive halotriazinyl-containing phthalocyanine dyestuffs have been previously disclosed, but for the most part these dyestuffs have not been commercially accepted by reason of insufficient reactivity, and/or lack of sufficient strength or brightness of the desired green or bluegreen shades or other relatively inferior properties.

It is an object of this invention to provide dyestuffs, methods for producing same, methods for coloring fibers herewith, and dyeings produced therewith which will not be subject to one or more of the above disadvantages. Other objects and advantages will appear as the description proceeds.

The attainment of the above objects is made possible by the present invention according to which there is provided a dyestuff of the formula

I

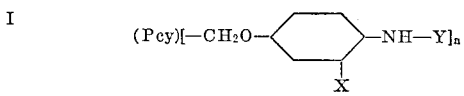

wherein Pcy represents a dyestuff moiety of the phthalocyanine series, X represents —H, —SO$_3$H or —SO$_2$NR$^1$R$^2$, R$^1$ and R$^2$ represent H, aryl or lower alkyl or, together with the N atom, the atoms necessary to complete a 5 or 6 membered heterocycle, Y represents a 2-chloro-s-triazinyl-(6) radical, and $n$ has an average value of about 1 to 4.

As employed in the above formula and hereinafter, the terms Pcy, phthalocyanine dyestuff and/or dyestuff of the phthalocyanine series are inclusive of unmetallized phthalocyanine molecules, and metallized phthalocyanine molecules such as the preferred copper, in addition to cobalt, aluminum, nickel, iron, zinc, vanadium, tin, magnesium, chromium, and other metal phthalocyanines. Whether metallized or unmetallized, such phthalocyanine molecule may be nuclearly substituted by one or more lower alkyl such as methyl or ethyl, halogen such as chlorine or bromine, phenyl, or water solubilizing groups such as sulfonic or carboxylic acid, sulfonamide, or the like.

In the above structural Formula I, the bracketed portion is nuclearly bonded to the fundamental phthalocyanine nucleus, and one or more of the four benzene rings in such nucleus may be substituted by the bracketed group.

In the above Formula I, X represents H, SO$_3$H (including as equivalents its alkali metal, metal, alkaline earth metal, ammonium, and organic amine salts), or any of the following illustrative sulfonamido groups:

—SO$_2$NH$_2$
—SO$_2$NHCH$_3$
—SO$_2$NHC$_2$H$_5$

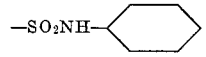

—SO$_2$N(CH$_3$)$_2$
—SO$_2$N(C$_2$H$_5$)$_2$

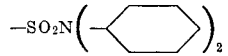

—SO$_2$N(CH$_3$)(C$_2$H$_5$)

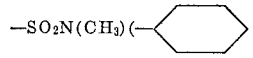

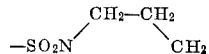

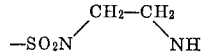

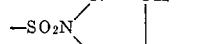

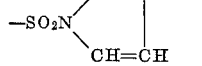

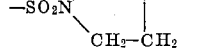

Y in Formula I is a 2-chloro-s-triazinyl-(6) radical, i.e. a 2,chloro-1,3,5-triazine radical joined in 6 position to the depicted —NH— group and containing in the 4 position H (unsubstituted), chloro, or any other organic or inorganic substituent, such substituent being relatively unrelated to the basic inventive concept herein. Illustratively, Y may be depicted in slightly more limited form by the following formula:

II

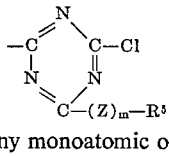

wherein Z can be any monoatomic or polyatomic divalent bridging group such as O, S, SO$_2$, SO$_2$NR$^3$, SO$_3$, OSO$_3$, CH$_2$, CH$_2$O, CONR$^3$, NR$^3$, NR$^3$CO, or N=N or the like or any combination thereof; R$^3$ represents H, lower alkyl, cycloalkyl, or aryl; R$^4$ represents Cl, any of the values given for R$^3$ or, when bonded to the same N atom to which R$^3$ is bonded, the atoms necessary to complete a 5 or 6 membered heterocycle; and $m$ is 0 or 1.

As illustrative of the dyestuffs of the present invention, there may be mentioned compounds of the above Formula I wherein Pcy is copper phthalocyanine, X is SO₃H, and Y has the above Formula II wherein $$-(Z)_m-R^4$$

is H, OH, Cl, SH, S—C₂H₅, S-phenyl, S—C(CH₃)(:NH), S—CS—N(C₂H₅)₂, SCN, S-benzthiaz-2-yl, SO₂H, SO₃H, OSO₃H, CH₂OH, C₂H₅, C₂H₄OH, benzyl, phenyl, p-carboxyphenyl, α-naphthyl, azo-(3,6-disulfo - 8 - naphthol-(1)), NH₂, N-methylamino, 2-sulfoethylamino, N,N-diethanolamino, N-methylolamono, N(CH₃)₂(NH₂)Cl, aminopropyleneamino, N,N - bis(sulfatoethyl)-amino, N-sulfatoethylsulfonamido, anilino, p-toluidino, N-methyl-m-sulfonanilino, p-carboxyanilino, 3 - sulfo-4-carboxyanilino, α-(3,6 - disulfo)naphthylamino, acetylamino, benzoylamino, NHCH₂OCH₃, N-(α - anthraquinonyl)-amino, NH-p-phenyl-azo - (3-sulfo - 4 - hydroxy)-phenyl, 2 - naphthylazophenylamino, morpholinyl, piperidinyl, iminobenzyl copper phthalocyanine, ethoxy, phenoxy, m-sulfophenoxy, benzoxy, or cyclohexylamino, or the like, and n has a value of 3.

It will be understood that without departing from the spirit and scope of the present invention, there may be provided compounds equivalent to Formula I above wherein the bracketed benzene ring may be substituted in any of the vacant positions by lower alkyl such as methyl or ethyl, lower alkoxy such as ethoxy, or methoxy, phenyl, that R¹, R², R³, or R⁴ values other than H may be substituted by similar lower alkyl, lower alkoxy, phenyl or phenoxy groups or by hydroxy, sulfonic, carboxylic, or any dyestuff moiety containing a labile or replacable H atom; that the 4-position in Y may be similarly substituted by any of the above listed sulfonamido values for X joined directly to the triazinyl C-atom or indirectly through any of the values given above for Z and/or R⁴; and that Cl may be substituted by Br.

The dyestuff of the present invention may in general be prepared by reacting one mole of an aminophenoxymethylated phthalocyanine compound of the formula

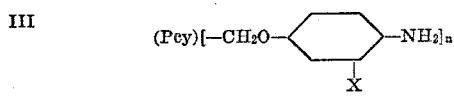

III with n moles of a triazinyl compound of the Formula Cl—Y, Pcy, X, n, and Y having the values given above. The compound of Formula III above, and the method for making same by reacting a chloromethylated phthalocyanine with a p-hydroxyacyanilide at elevated temperatures and ten hydrolyzing the acylamino group to NH₂, are disclosed and claimed in our above mentioned copending application Ser. No. 517,129. The triazinyl compound Cl—Y employed in the reaction may be cyanuric chloride, or a 2,6-dichloro-s-triazine wherein the 4 position is unsubstituted or contains any desired substituent such as any of the values, other than chloro, given for the —(Z)ₘ—R⁴ group in Formula II above. When cyanuric chloride is employed, a dyestuff of the invention is obtained containing a fiber-reactive dichlorotriazinyl group, which if desired may be changed to a monochlorotriazinyl group by suitable replacement of one of the ring-bound chlorine atoms is known manner with a radical of the aforementioned Formula —(Z)ₘ—R⁴.

The reaction between the triazinyl chloride compound Cl—Y and the aminophenoxymethylated phthalocyanine compound of Formula III is readily carried out in known manner at a pH of about 3.5–8.5 in an aqueous or organic solvent medium and the desired dyestuff thus obtained isolated at neutral or slightly acidic pH as by filtering followed by drying, usually at temperatures below 100° C. in a vacuum oven.

The dyestuffs of the invention have been found to be highly effective for coloring natural and synthetic fibers containing reactive or labile atoms such as labile hydrogen atoms, particularly cellulose textile fibers, in pleasing greenish or bluish green shades that are very fast to light and washing. The coloring process involves dyeing, including printing, the fibrous material by application thereto under acid binding conditions of an aqueous medium containing at least one of the above defined dyestuffs of the invention in any desired proportions such as from about 0.5 to 5% based on the weight of the fiber.

It will be understood that as employed herein, the term "aqueous medium" is intended to include the preferred aqueous solutions of the dyestuffs in addition to dispersions or stable colloidal suspensions thereof, properly thickened in known manner when employed in a printing process. It will also be understood that while aqueous media are preferred, the water in the aqueous medium may be replaced in whole or in part by a water miscible, organic solvent such as acetone, alcohol, ether, dioxane, dimethylformamide, N-methylpyrrolidone, or the like without departing from the scope of this invention. Similarly, such medium may contain adjuvants commonly used in dyeing processes as for example solution aids such as urea and thiodiglycol, migration inhibitors such as cellulose ethers, sodium chloride, sodium sulfate and other salts, wetting agents preferably of the anionic, or nonionic surface active type as produced for example by polyoxyethylenation of such reactive hydrogen containing compounds as higher molecular weight alcohols, phenols, fatty acids and the like, buffering agents such as mixtures of monosodium and disodium (or corresponding potassium) phosphates or aryl sulfonamides, and protective colloids and thickening agents for the production of printing pastes such as methyl cellulose, sodium alginate, and the like.

The aqueous medium containing the reactive dyestuffs of the invention may be applied to the fiber by immersion, jig dyeing, padding, spraying, printing or in any other desired manner and involves a reaction between the dyestuff and the fiber containing a reactive hydrogen atom with liberation of a hydrohalide. The reaction is accordingly favored by acid binding conditions preferably achieved by application of an acid binding agent to the fiber together with, prior to or subsequent to application of the dyestuff. As suitable acid binding agents, there may be mentioned generally alkali metal (sodium, potassium, lithium, etc.) hydroxide, carbonate, bicarbonate, phosphate, silicate, borate, acetate or the like, in an amount sufficient to neutralize the liberated hydrohalide in whole or in part. Such amount may range from less than 0.5% to 10% or more based on the weight of the aqueous medium containing the reactive dyestuffs. Instead of the above defined acid binding agents, a substance may be employed which liberates an acid binding agent upon subsequent subjection to elevated temperatures. An example of such a substance is sodium trichloroacetate, and the use of such a substance requires subsequent application of elevated temperatures such as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene packaging film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 10 minutes or less to several hours or more. Preferably, the fiber is continuously padded with the fiber-treating medium containing the chromophoric compound, squeezed to, for example, a 50 to 200% liquor pickup, dried and heated at 90 to 150° C. for an hour or more to 30 seconds or less, followed by washing and rinsing. A dry heat treatment may be substituted by a steaming or the like if desired.

The dyeing process of this invention is particularly effective for dyeing and printing cellulosic fibers of natural or synthetic type such as cotton, linen, wood, paper, regenerated cellulose and the like in any desired shades of good to excellent fastness properties. In addition to cellulose and its derivatives, the invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, and the like. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic, hydroxy or amide linear or side groups, polyvinyl alcohol, partially hydrolyzed cellulose acetate and polyvinyl acetate, polyvinyl chloride, and mixtures, copolymers and graft copolymers thereof. Mixed fabrics and fibers may be similarly treated, and concurrent use of different fiber-reactive dyestuffs of the present invention can be made for the production of novel and improved effects in any manner desired.

The fibers may be in any of the usual forms and in natural bulk, interwoven, knitted or felted form as for example in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention, and the fundamental concepts and teachings thereof.

The following examples are only illustrative of the present invention and are not to be regarded as limitative. All parts and proportions referred to herein and in the appended claims are by weight unless otherwise indicated.

EXAMPLE 1

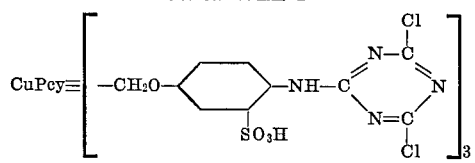

(a) Into a 1000 ml. beaker equipped with a stirrer, thermometer and the electrodes of a pH meter is charged 29.87 g. (0.025 mole) tris(4-amino - 3 - sulfo-phenoxymethyl)copper phthalocyanine 100% as 100 g. aqueous paste and 250 ml. water. After stirring until a smooth thin slurry is obtained, a fine suspension of cyanuric chloride is rapidly added in one portion. The fine suspension of cyanuric chloride is prepared by dissolving 13.8 g. (0.075 mole) of the material in 50 ml. acetone by warming to 55° C. and rapidly dumping this acetone solution of cyanuric chloride into 100 g. ice and water with rapid agitation. The pH of the reaction mixture is maintained at 5.0 to 5.5 by a gradual addition of 10% sodium hydroxide solution at 10° C. during a five hour period. A total of 136 ml. 10% sodium hydroxide solution are added. The reaction mixture is allowed to warm to room temperature during three hours and the product is salted out by a gradual addition of 80 g. sodium chloride during a one hour period. After stirring several more hours, the product is filtered and dried in a vacuum oven. The dried dye of the above formula weighs 40.7 g.

(b) 3 parts of the above dyestuff are introduced with stirring into 130 parts water and the dye bath stirred at room temperature for 5 minutes. At 35° C., 3 parts of sodium bicarbonate are then added and the bath stirred for 5 minutes. Cotton cloth is padded with the solution and the cloth dried and heat cured at 150° C. for 3 minutes after which it is boiled in soap water to remove unreacted dye, rinsed and dried. A green dyeing is obtained having excellent fastness properties.

(c) 3 parts of the above dyestuff are introduced into 130 parts of water and the dye bath stirred at room temperature for 5 minutes. Cotton cloth is padded with the dye bath solution and then with a solution of 3 parts sodium carbonate in 130 parts water after which the cloth is dried and heat cured at 150° C. for 3 minutes. After soaping, rinsing and drying, a dyeing is obtained with properties similar to that of (b) above.

(d) A print paste is prepared with 3 parts of the above dyestuffs, 10 parts urea, 1 part sodium m-nitrobenzenesulfonate, 24 parts hot water, 60 parts sodium alginate, and 2 parts sodium bicarbonate. Cotton cloth is printed with the paste, vat aged for 10 minutes, rinsed cold and then soaped for 3 minutes at 90° C. The prints have as good properties as the dyeings.

EXAMPLE 2

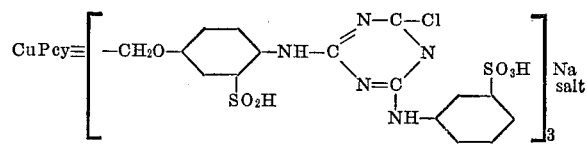

The procedure of Example 1(a) is repeated employing instead of cyanuric chloride an equivalent amount of 3-(3,5-dichloro-triazinylamino)benzene sulfonic acid, prepared from the condensation of molecular equivalent weights of cyanuric chloride and metanilic acid, in the form of an approximately 10% aqueous solution. The resulting dyestuff of the above formula, when applied by the procedures of Example 1(b)–(d), yields green dyeings and prints of similarly improved properties.

EXAMPLE 3

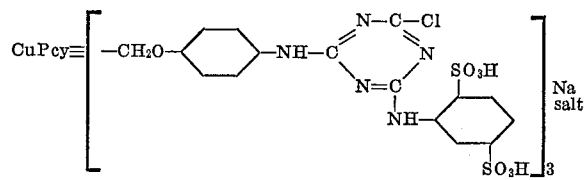

The procedure of Example 1(a) is repeated using an equivalent amount of tris-(4-aminophenoxymethyl)copper phthalocyanine instead of the tris-(4-amino-3-sulfo-phenoxymethyl)copper phthalocyanine, and an equivalent amount of the condensation product of cyanuric chloride with an equimolar amount of 2,5-aniline sulfonic acid instead of the cyanuric chloride. The resulting dyestuff of the above formula, when applied by the procedures of Example 1(b)–(d) yields blue-green dyeings and prints of similarly improved properties.

EXAMPLE 4

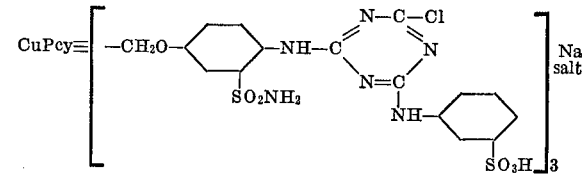

The procedure of Example 2 is repeated using an equivalent amount of tris(4-amino-3-sulfonamide-phenoxymethyl)copper phthalocyanine instead of the tris(4-amino-3-sulfophenoxymethyl)copper phthalocyanine. The resulting dyestuff of the above formula, when applied by the procedures of Example 1(b)–(d) yields green dyeings and prints of similarly improved properties.

We claim:
1. A dyestuff of the formula:

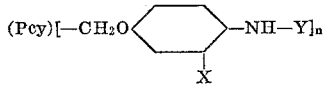

wherein:
Pcy represents copper phthalocyanine,
X represents —H, —$SO_3H$ or —$SO_2NR^1R^2$,
$R^1$ and $R^2$ represent H, phenyl or lower alkyl or, together with the N atom, the atoms necessary to complete a piperidinyl, piperazinyl, pyrazolyl, morpholinyl, pyrrolyl, or 2-pyrrolidonyl heterocycle,
Y represents a 2-chloro-s-triazinyl-(6) radical containing in the 4 position a member of one of the following groups (A) and (B) consisting of:
(A) H, OH, Cl, SH, S—$C_2H_5$, S-phenyl, S—C($CH_3$) (:NH), S—CS—N($C_2H_5$)$_2$, SCH, $SO_2H$, $SO_3H$, $OSO_3H$, $CH_2OH$, $C_2H_5$, $C_2H_4OH$, benzyl, phenyl, p-carboxy-phenyl, α-naphthyl, ethoxy, phenoxy, m-sulfophenoxy, and benzoxy, and
(B) azo-(3,6-disulfo-8-naphthol-(1)), $NH_2$, N-methylamino, 2 - sulfoethylamino, N,N - diethanolamino, N-methylolamino, N($CH_3$)$_2$($NH_2$)Cl, aminopropylenamino, N,N - bis(sulfatoethyl)-amino, N-sulfatoethylsulfonamido, anilino, p-toluidino, N-methyl-m-sulfoanilino, p-carboxyanilino, 3-sulfo - 4 - carboxyanilino, α-(3,6-disulfo)naphthylamino, acetylamino, benzoylamino, $NHCH_2OCH_3$, N-(α-anthraquinonyl)-amino, NH-p-phenyl-azo-(3-sulfo-4-hydroxy)-phenyl, 2-naphthylazophenylamino, morpholinyl, piperidinyl, iminobenzyl copper, phthalocyanine, and cyclohexylamino, provided that when X is H, Y is substituted in the 4 position only by a member selected from group (B) above, and
n has an average value of 1 to 3.

2. A dyestuff as defined in claim 1 wherein X represents —$SO_3H$, and Y represents 2,4-dichloro-s-triazinyl-(6).

3. A dyestuff as defined in claim 1 wherein X represents —$SO_3H$, and Y represents 2-chloro-4-m-sulfoanilino-s-triazinyl-(6).

4. A dyestuff as defined in claim 1 wherein X represents H, and Y represents 2-chloro-4-(2',5'-disulfoanilino)-s-triazinyl-(6).

5. A dyestuff as defined in claim 1 wherein X represents —$SO_2NH_2$, and Y represents 2-chloro-4-m-sulfoanilino-s-triazinyl-(6).

References Cited

UNITED STATES PATENTS

| | | | |
|---|---|---|---|
| 3,029,123 | 4/1962 | Putter et al. | 260—249 XR |
| 3,133,059 | 5/1964 | Clark et al. | 260—249.5 XR |
| 3,255,191 | 6/1966 | Dexter et al. | 260—249.5 XR |
| 3,399,194 | 8/1968 | Mangini et al. | 260—249.5 XR |
| 3,405,133 | 10/1968 | Poole | 260—249.5 |

NORMA S. MILESTONE, Primary Examiner

J. M. FORD, Assistant Examiner

U.S. Cl. X.R.

8—21, 46, 54.2; 260—153, 247.5, 249.5, 249.8

UNITED STATES PATENT OFFICE
CERTIFICATE OF CORRECTION

Patent No. 3,509,138      Dated April 28, 1970

Inventor(s) Harlan B. Freyermuth et al

It is certified that error appears in the above-identified patent and that said Letters Patent are hereby corrected as shown below:

Column 2, line 60, the "$R^5$" substituent in the structural formula should read -- $R^4$ --. Column 3, line 11, "N-methylol-amono" should read -- N-methylolamino --. Column 6, line 30, the "$SO_2H$" substituent in the structural formula should read -- $SO_3H$ --.

SIGNED AND SEALED
NOV 17 1970

(SEAL)
Attest:

Edward M. Fletcher, Jr.
Attesting Officer

WILLIAM E. SCHUYLER, JR.
Commissioner of Patents